United States Patent
Ressnig et al.

(10) Patent No.: US 11,964,912 B2
(45) Date of Patent: Apr. 23, 2024

(54) FREEZE-THAW STABLE QUICK-SET ADDITIVE

(71) Applicant: Dow Global Technologies LLC, Midland, MI (US)

(72) Inventors: Debora Ressnig, Zurich (CH); Margarita Perello, Horgen (CH)

(73) Assignee: DOW GLOBAL TECHNOLOGIES LLC, Midland, MI (US)

(*) Notice: Subject to any disclaimer, the term of this patent is extended or adjusted under 35 U.S.C. 154(b) by 131 days.

(21) Appl. No.: 17/424,755

(22) PCT Filed: Feb. 13, 2020

(86) PCT No.: PCT/US2020/018019
§ 371 (c)(1),
(2) Date: Jul. 21, 2021

(87) PCT Pub. No.: WO2020/214235
PCT Pub. Date: Oct. 22, 2020

(65) Prior Publication Data
US 2022/0135483 A1 May 5, 2022

Related U.S. Application Data

(60) Provisional application No. 62/834,460, filed on Apr. 16, 2019.

(51) Int. Cl.
*C04B 14/26* (2006.01)
*C04B 28/06* (2006.01)
*C09D 1/08* (2006.01)
*C04B 111/00* (2006.01)
*C04B 111/20* (2006.01)
*C09D 7/20* (2018.01)

(52) U.S. Cl.
CPC ............. *C04B 28/06* (2013.01); *C04B 14/26* (2013.01); *C09D 1/08* (2013.01); *C04B 2111/00043* (2013.01); *C04B 2111/00482* (2013.01); *C04B 2111/29* (2013.01); *C09D 7/20* (2018.01)

(58) Field of Classification Search
CPC .................. C04B 28/06; C04B 14/26; C04B 2111/00043; C04B 2111/00482; C04B 2111/29; C04B 26/06; C04B 41/5081; C04B 28/065; C04B 40/0039; C04B 2103/009; C04B 28/02; C04B 7/32; C04B 22/10; C04B 24/005; C04B 24/02; C04B 24/04; C04B 24/10; C04B 24/12; C04B 24/124; C04B 24/14; C04B 24/2676; C04B 14/28; C04B 24/126; C04B 24/2641; C09D 1/08; C09D 7/20
See application file for complete search history.

(56) References Cited

U.S. PATENT DOCUMENTS

| | | | |
|---|---|---|---|
| 4,325,856 A | 4/1982 | Ishikawa et al. | |
| 4,654,397 A | 3/1987 | Mueller-Mall et al. | |
| 4,733,005 A | 3/1988 | Schmidt et al. | |
| 4,814,373 A | 3/1989 | Frankel et al. | |
| 5,162,415 A | 11/1992 | Rehmer et al. | |
| 6,492,451 B1 | 12/2002 | Dersch et al. | |
| 2014/0343194 A1 | 11/2014 | Taquet et al. | |
| 2018/0319712 A1 | 11/2018 | Seip et al. | |
| 2020/0180013 A1 | 6/2020 | Ohgi et al. | |

FOREIGN PATENT DOCUMENTS

| | | | | |
|---|---|---|---|---|
| EP | 0005987 | | 12/1979 | |
| EP | 0005987 A1 | * | 12/1979 | |
| EP | 2431341 | | 3/2012 | |
| EP | 3225606 | | 10/2017 | |
| GB | 1599919 A | * | 10/1981 | ........... E21D 20/023 |
| JP | 2019025817 | | 2/2019 | |
| WO | 199925780 | | 5/1999 | |
| WO | 2017076807 | | 5/2017 | |
| WO | 2017093703 | | 6/2017 | |

OTHER PUBLICATIONS

Concrete Society. High alumina cement concrete [retrieved from the internet at Apr. 24, 2023 from <URL:https://www.concrete.org.uk/fingertips-nuggets.asp?cmd=display&id=687>] (Year: 2018).*
WebQC.org chemical portal molar mass, molecular weight and elemental composition calculator. potassium carbonate [retrieved from the web at Jun. 28, 2023 from <URL:https://www.webqc.org/molecular-weight-of-potassium+carbonate.html>] (Year: 2017).*
WebQC.org chemical portal molar mass, molecular weight and elemental composition calculator. glycerol [retrieved from the web at Jun. 28, 2023 from <URL:https://www.webqc.org/molecular-weight-of-C3H8O3%28glycerol%29.html>]. (Year: 2017).*
Fox, Bull. Am. Physics Soc., 1956, p. 123, vol. 1, No. 3.
Mjalli, "Ionic liquids analogues based on potassium carbonate", Thermochimica Acta, 2014, p. 135-143, No. 575.

(Continued)

*Primary Examiner* — Anthony J Green
*Assistant Examiner* — Marites A Guino-O Uzzle

(57) ABSTRACT

The present invention provides substantially water free aluminate cement paste compositions that exhibit improved freeze thaw resistance and are storage stable upon being activated on admixture with water or an aqueous liquid. The compositions comprise a deep eutectic solvent mixture of a polar organic carrier component, preferably, glycerol or another hydrogen donor, and an anhydrous cation containing component, such as a metal salt or an onium compound in a paste with an aluminate cement. The compositions can be kept for as long as 30 days or more at room temperature without stabilization and then used to make cementitious coating layers or waterproofing membranes.

12 Claims, No Drawings

(56) References Cited

OTHER PUBLICATIONS

Zhang, "Deep eutectic solvents: syntheses, properties and applications", Chem. Soc. Rev., 2012, p. 7108-7146, vol. 41.

\* cited by examiner

FREEZE-THAW STABLE QUICK-SET ADDITIVE

The present invention relates to a substantially water free quick-set additive for application in coatings, flexible membrane and organic plaster applications. More particularly, it relates to compositions comprising a deep eutectic solvent mixture and a calcium aluminate cement that is freeze thaw stable and provides early rain resistance.

Quick-set cure accelerators find use in dry mix or dispersion applications of hydraulic cement across the construction and coatings industries. Various known quick setting polymeric compositions are available and can provide early rain resistance (ERR). For example, emulsion polymers in combination with acid stabilized aluminate cements, such as phosphoric acid stabilized calcium aluminate cements (CAC), provide known quick-setting hybrid binders. To use such formulations, the hybrid binder of cement and emulsion may be combined at the time of use with compositions comprising an activating additive that includes a base and a lithium salt accelerator. The activated composition can then comprise or be used as a paint, render or plaster, or a water proofing membrane.

US20140343194 A1 to Taquet et al. discloses stabilized aqueous aluminous cements, for example, aqueous CAC. Taquet discloses CAC stabilized with aqueous phosphoric acid rather than boric acids or acetic acid derivatives. The disclosed CAC cements include those that are highly reactive and provide early strength and fast cure. The compositions have been used to accelerate the setting of cement, concrete and, more recently, to accelerate the setting of organic coatings at a high humidity and/or temperature. However, the compositions disclosed in Taquet being waterborne are not freeze-thaw stable, such as below −10° C., and have therefore limited storage/transportation stability especially when the outdoor temperatures get cold or change rapidly. Further, because the compositions disclosed in Taquet are stabilized, they require extra base or activator to reactivate them.

Acid stabilized aqueous aluminous cement compositions should be held at pH<8 to guarantee storage stability, otherwise the cement hydration and exotherm could start during storage. However, existing metastable and commercial paint, render and plaster formulations maintain their storage stability at a pH of 9 to 11; further, additives such as pigment slurries, biocides are optimized to this higher pH window. Mixing such paint, render and plaster formulations with the acid stabilized aqueous cement compositions would result in rapid cure of the paint, and thus drastically reduce storage stability. Accordingly, one would need to combine the composition with the acid stabilized aqueous cement or separately apply the paint, render or plaster in use; this would prove very cumbersome or even impracticable unless one were willing to accept applications wherein the paint, plaster or render formed a separate layer or phase from that of the cement. Accordingly, there remains a need for paint, render and plaster formulations that can incorporate cement quick set additives while still enabling a reasonable window for application or pouring.

In addition, acid stabilized aqueous aluminous cement compositions often need an accelerator, such as lithium salts, to achieve a desired setting speed that matches the fast setting behavior of such aluminate cements without chemical stabilization. Thus, it remains desirable to eliminate the use of accelerators which can be a toxic and costly component while maintaining a stable cement composition.

In accordance with the present invention, the present inventors have solved the problem of providing a liquid or paste aluminate cement which is shelf stable and yet compatible with alkali stable emulsion polymers, renders and plasters that enables to cure quickly even when used at temperatures down to 0° C. and at a high relative humidity above 50%.

STATEMENT OF THE INVENTION

1. In accordance with the present invention, a substantially water free aluminate cement paste composition comprises a deep eutectic solvent mixture of a polar organic carrier component, preferably, one or more polar protic organic liquids, in association with an anhydrous cation containing component, and, further, comprises an aluminate cement, preferably, a calcium aluminate cement, wherein the substantially water free aluminate cement paste composition that when combined with water or an aqueous liquid to form a hydraulic setting composition provides quick drying and early rain resistance down to temperatures of 5° C.
2. In accordance with the substantially water free aluminate cement paste composition present invention as in item 1, above, wherein the polar organic carrier component of the deep eutectic solvent mixture is chosen from a hydrogen donor.
3. In accordance with the substantially water free aluminate cement paste composition of the present invention as in any one of items 1 or 2, wherein the polar organic carrier component of the deep eutectic solvent mixture is chosen from glycerol, ethylene glycol, $C_3$ to $C_{18}$ alkane diols, urea, acetamide, 1-methyl urea, 1,3-dimethyl urea, thiourea, benzamide, carboxylic acids, polyols or carbohydrates, oligomers or polymers of a diol, such as polyalkoxylated glycerols, for example, a propoxylated glycerol, oligomers or polymers of a polyol, oligomers or polymers of an organic acid, oligomers or polymers of a saccharide, oligourethanes, polypeptides, or two or more of these, wherein, preferably, any carbohydrate, oligomer or polymer of a polyol, oligomer or polymer of an organic acid or oligomer or polymer of a saccharide has a formula molecular weight (formula weight) of from 150 to 2,000, or, more preferably, a formula weight of from 150 to 1,000.
4. In accordance with the substantially water free aluminate cement paste composition of the present invention as in any one of items 1, 2, or 3, above, wherein the polar organic carrier component is chosen from glycerol, propoxylated glycerol, ethylene glycol, urea, acetamide, 1-methyl urea, 1,3-dimethyl urea, thiourea, carbohydrates, or two or more of these.
5. In accordance with the substantially water free aluminate cement paste composition of the present invention as in any one of items 1, 2, 3 or 4, above, wherein the amount of the polar organic carrier component in the deep eutectic solvent mixture ranges from 40 to 99 mol. %, or, preferably, from 45 to 95 mol. %, or, more preferably, from 50 to 90 wt. % with the remainder comprising the anhydrous cation containing component.
6. In accordance with the substantially water free aluminate cement paste composition of the present invention as in any one of items 1, 2, 3, 4 or 5, above, wherein the anhydrous cation containing component is chosen from non-toxic quaternary ammonium containing materials; ammonium salts, organoammonium salts, simple salts, for example, of metals; salts of cyanamide; metal cations combined with non-volatile amines; onium salts; metal cations combined with organic nitrides; metal cations combined with organic sulfonates, metal cations combined with organic sulfonyl group containing compounds, or two or more of these.

7. In accordance with the substantially water free aluminate cement paste composition of the present invention as in any one of items 1, 2, 3, 4, 5, or 6, above, wherein the anhydrous cation containing component is chosen from choline chloride (ChCl), (hydroxyethyl) trimethylammonium chloride, ammonium chloride, 1-n-butyl-3-methylimidazolium salts, metal carbonates, semi-metal carbonates, metal halides, semi-metal halides, metal nitrates, metal nitrites, metal sulphates, metal phosphates, metal carbodiimides, salts of cyanamide, metal citrates, metal acetates, non-volatile amines, benzyltriphenylphosphonium halides, metal cations combined with $(CF_3CO_2)_2N$, metal cations combined with trifluoromethanesulfonate, metal cations combined with bis(trifluoromethanesulfonyl) imide, metal cations combined with tris(trifluoromethanesulphonyl) methide, or two or more of any of these, preferably, choline chloride or metal carbonates.

8. In accordance with the substantially water free aluminate cement paste composition of the present invention as in item 1, above, wherein the deep eutectic solvent mixture comprises $K_2CO_3$ and glycerol in a molar ratio of from 1:1 to 1:6, $K_2CO_3$ and ethylene glycol, preferably, anhydrous ethylene glycol, in a molar ratio of from 1:3 to 1:8, or $K_2CO_3$ and propoxylated glycerol in molar ratios of from 1:14 to 1:30, or, preferably, from 1:16 to 1:24.

9. In accordance with the substantially water free aluminate cement paste composition of the present invention as in any one of items 1, 2, 3, 4, 5, 6, 7, or 8, above, wherein the aluminate cement is chosen from alkali aluminate cement, preferably, calcium aluminate cement, and their mixtures.

10. In accordance with the substantially water free aluminate cement paste composition of the present invention as in any one of items 1, 2, 3, 4, 5, 6, 7, 8, or 9, above, wherein the composition comprises anhydrous additives chosen from pigments, inorganic colloidal particles or fillers (e.g. alumina or silica), reducing agents, synthetic thickeners, dispersants, polycarboxylates, polymeric superplasticizers, plasticizers, oils, defoamers, air entraining agents, or two or more of any of these.

11. In accordance with the substantially water free aluminate cement paste compositions as set forth in any one of items 1, 2, 3, 4, 5, 6, 7, 8, 9 or 10, wherein the amounts of the deep eutectic solvent mixture range from 20 to 95 wt. %, or, preferably, from 25 to 55 wt. %, based on the total weight of the composition.

12. In accordance with the substantially water free aluminate cement paste compositions as set forth in any one of items 1, 2, 3, 4, 5, 6, 7, 8, 9, 10, or 11, above, wherein the amounts of the aluminate cement solids range from 5 to 80 wt. %, or, preferably, from 45 to 75 wt. %, based on the total weight of the composition.

13. In accordance with the substantially water free aluminate cement paste compositions as set forth in any one of items 1, 2, 3, 4, 5, 6, 7, 8, 9, 10, 11, or 12, above, wherein the total amount of the anhydrous additives, with the exception of fillers, ranges from 0 to 40 wt. %, or, preferably, from 0 to 20 wt. %, based on the total weight of the cement paste composition, and wherein the total amount of anhydrous fillers ranges up to 40 wt. %, or, preferably, from 0 to 20 wt. %, of the total cement paste composition.

14. In accordance with another aspect of the present invention, a method of making a substantially water free aluminate cement paste composition comprises mixing together a polar organic carrier component and one or more anhydrous cation containing component for a period of from 10 minutes to 48 hours or, preferably, from 1 to 5 hours and at temperatures of from 20° C. to the boiling point of the polar organic carrier component, such as at or below 150 C or, preferably, from 40 to 100° C. to form a deep eutectic solvent mixture, followed by dispersing in either order of addition, an aluminate cement and one or more anhydrous additives, if used, in the deep eutectic solvent mixture.

15. In accordance with the method of making a substantially water free aluminate cement paste composition as in item 14, above, wherein the mixing together of the polar organic carrier component and the anhydrous cation containing component comprises mixing in a mechanical mixer, such as a banbury mixer, homogenizer or a dissolver, preferably, one equipped with a devolatilizer.

16. In accordance with the method of making a substantially water free aluminate cement paste composition as in any one of items 14 and 15, above, wherein the dispersing of the aluminate cement and any anhydrous additives in the deep eutectic solvent mixture comprises dispersing in a cement mixer, a mechanical mixer, such as a banbury mixer, or a planetary mixer.

17. In accordance with yet another aspect of the present invention, a method of using a substantially water free aluminate cement paste composition as set forth in any one of items 1, 2, 3, 4, 5, 6, 7, 8, 9, 10, 11, 12, or 13, above, comprises bringing the aluminate cement paste composition in contact with water or an aqueous liquid, preferably, an aqueous coating composition, and, if desired, one or more in use additive, for example, in a cement mixer, to form a hydraulic setting aluminate composition, applying or pouring the resulting hydraulic aluminate setting composition, and allowing it to cure.

18. In accordance with the method of using a substantially water free aluminate cement paste composition as set forth in item 17, above, wherein the method comprises mixing the aluminate cement paste composition with water or an aqueous liquid, preferably, an aqueous coating composition, to form a hydraulic setting composition and applying it to a substrate to form a layer or coating, such as by troweling or screeing.

19. In accordance with the method of using a substantially water free aluminate cement paste composition as set forth in item 17, above, comprising mixing an aqueous coating composition, preferably, an aqueous emulsion copolymer composition, with the aluminate cement paste composition, and applying the aluminate cement paste composition to form a layer or coating.

20. In accordance with yet still another aspect of the present invention, a hydraulic setting aluminate composition comprises the substantially water free aluminate cement paste composition as set forth in any one of items 1, 2, 3, 4, 5, 6, 7, 8, 9, 10, 11, 12, or 13, above, in combination with water or an aqueous liquid, preferably, an aqueous coating composition, such as an aqueous emulsion copolymer composition, and, if desired, one or more in use additive.

21. In accordance with the hydraulic setting composition as set forth in item 20, above, wherein the aqueous liquid is an aqueous emulsion copolymer composition chosen from an acid stabilized emulsion copolymer, a metastable emulsion copolymer and a phosphorus acid group containing emulsion polymer.

Unless otherwise indicated, conditions of temperature and pressure are ambient temperature and standard pressure. All ranges recited are inclusive and combinable.

Unless otherwise indicated, any term containing parentheses refers, alternatively, to the whole term as if no parentheses were present and the term without them, as well as combinations of each alternative. Thus, the term "(poly) diol" refers to any of a diol, a polydiol or their mixtures.

All ranges are inclusive and combinable. For example, the term "a range of from 20 to 80 wt. %, or, preferably, from 25 to 65 wt. %" of a deep eutectic solvent mixture would include each of from 20 to 25 wt. %, from 20 to 80 wt. %, from 20 to 65 wt. %, from 25 to 80 wt. %, from 65 to 80 wt. %, and, preferably, from 25 to 65 wt. % of a deep eutectic solvent mixture.

As used herein, the term "anhydrous" is used interchangeably with "substantially water free" and means that a composition may comprise some substantially water free salts that contain water of hydration; thus, and "anhydrous additive" can include a salt that contains some water of hydration so long as the total cement paste composition remains substantially water free.

As used herein, the term "aqueous" or "waterborne" when used to define emulsion copolymer coating compositions means that the continuous phase of the waterborne coating composition and that of the aqueous emulsion polymer is composed of from 50% to 100%, by weight, water; it can also comprise water miscible organic solvents.

As used herein, the term "ASTM" refers to publications of ASTM International, West Conshohocken, PA.

As used herein, the term "deep eutectic solvent mixture" means a mixture of two or more materials that are capable of self-association, such as through hydrogen bond interactions, to form a eutectic mixture with a melting point lower than that of each individual component.

As used herein, the term "freezing point" refers to a temperature at atmospheric pressure at or below which a given fluid mixture no longer flows but above which the same mixture will regain its fluidity.

As used herein, the term "hydraulic binder" means any mineral composition, usually of finely ground materials, which upon addition of an appropriate quantity of water forms a binding paste or slurry capable of hardening when brought into contact with water either in or under water, thereby binding together the materials.

As used herein, the term "polymer" includes homopolymers and copolymers that are formed from two or more different monomer reactants or that comprise two distinct repeat units.

As used herein, the term "substantially water free" refers to a composition containing no added water other than water of and wherein the total amount of water, by weight, ranges less than 2,000 ppm, or, preferably, less than 1000 ppm.

As used herein, the term "surfactant" means a water dispersible organic molecule that contains both a hydrophilic group or phase, such as an oligoethoxylate, and a hydrophobic group or phase, such as $C_8$ alkyl or alkylaryl group.

As used herein, the term "total solids" refers to all materials in given composition aside from solvents, liquid carriers, unreactive volatiles, including volatile organic compounds or VOCs, and water. Ammonia does not count as a solid.

As used herein, the term "use conditions" means atmospheric or ambient pressures and temperatures at which the cement paste composition is activated and applied or poured, and may include temperatures as low as −5° C. and as high as 40° C.

As used herein, the term "weight average molecular weight" or MW refers to the weight average of the molecular weight distribution of a polymer or plasticizer material determined using gel permeation chromatography (GPC) of a polymer dispersion in water at room temperature using the appropriate conventional polyglycol, vinyl or styrene polymer standards.

As used herein, the term "weight average particle size" refers to the weight average of the particle size distribution particle size of an indicated material as determined by light scattering or another equivalent method.

As used herein, the phrase "wt. %" stands for weight percent.

In accordance with the present invention, the inventors have found that a cement paste composition of a deep eutectic solvent mixture of a polar organic carrier component, such as one or more proton donors like a glycol or glycerol, and an anhydrous cation containing component, the mixture having a freezing point of 0° C. or less, or, preferably, −15° C. or less, or, more preferably, −30 or less ° C. can be loaded with aluminate cements, for example, calcium aluminate cement (CAC), to solids concentrations of from 40 to 70 wt. % to give pastes that are storage stable over a period of one or more months, for example, 30 days or more, or, preferably, 100 days, while the reactivity of the cement is maintained. Further, the activator in the cement paste compositions comprises the aluminate cement itself instead of a base and an accelerator salt; accordingly, the compositions of the present invention become activated through contact with only water or another aqueous liquid. Using an aluminate cement accelerator paste instead of an acid stabilized cement decouples formulation pH from stability and creates a broader formulation window for use with coatings, paints, renders and plasters.

In accordance with the present invention, aluminate cement paste compositions provide early rain resistance, are freeze-thaw stable and more reactive at the time of use than conventionally or acid stabilized cement. The aluminate cement paste compositions are less stabilized, i.e. have less or no added stabilizer, than in the case of acid stabilized aqueous liquid cement. Therefore, less or even no lithium is required to achieve a rapid set or cure, and therefore early rain resistance, at low temperatures. In fact, compositions comprising a deep eutectic solvent mixture and, for example, a calcium aluminate cement provide early rain resistance at temperatures as low as −30° C. Accordingly, the cement paste compositions of the present invention can be used as a quick-set additive and co-binder that provides a hydraulic setting composition having early rain resistance under challenging conditions.

Because the aluminate cement is carried in a eutectic mixture of a polar organic carrier component and an anhydrous cation containing component that is substantially free of water, and, further, requires or contains no retarders for any hydraulic cement, the compositions of the present invention become highly reactive on contact with water or an aqueous liquid and provide early strength and fast cure.

The fluid, storage stable aluminate cement paste compositions of the present invention can comprise a broad spectrum of deep eutectic solvent mixtures as carriers. By changing the composition and physico-chemical properties of the deep eutectic solvent mixture, such as its freezing point, a versatile application spectrum emerges to enable different applications for aluminate cements.

In accordance with the present invention, a cement paste composition comprises a deep eutectic solvent mixture of a polar organic carrier component, preferably, one or more polar protic organic liquids, in association with an anhydrous cation containing component, and, further comprises an aluminate cement, wherein the deep eutectic solvent is a liquid or fluid at 0° C. or less, or, preferably, −15° C. or less, or, more preferably, −30° C. or less and atmospheric pressure. The freezing point of the deep eutectic solvent mixture at atmospheric pressure can readily be tested by mixing to form the mixture, freezing it and recording the freezing temperature.

Deep eutectic solvent mixtures comprise non-flammable compositions which have a boiling point above use conditions of from −5° C. to 40° C. Such mixtures form by association of a polar organic carrier component with a cation containing component, such as through hydrogen bonding of a polar organic hydrogen bond donor and an anhydrous cation containing acceptor. The polar organic carrier component may act as a hydrogen bond or electron donor that associates with the anhydrous cation containing component as a hydrogen bond or electron acceptor. The cation containing component can include one or more simple salts, such as potassium carbonate or non-toxic quaternary ammonium salts which can be either extracted from plants or other biomass or readily synthesized from known materials such as tertiary amines and organic halides.

Suitable polar organic carrier components can comprise one or more anhydrous polar organic materials, generally in a neat form, such as a hydrogen donor which can be glycerol, propoxylated glycerol, ethylene glycol, $C_3$ to $C_{18}$ alkane diols, urea, acetamide, 1-methyl urea, 1,3-dimethyl urea, thiourea, benzamide, carboxylic acids, such as oxalic, citric, succinic, malonic, adipic, or amino acids, polyols or carbohydrates, such as fructose or glucose and polymerized oligomers or polymers that form a deep eutectic solvent mixture that remains fluid in storage and use conditions, such as oligomers or polymers of a diol, polyol, organic acid or saccharide, for example, oligopolyols, polyglycerols, oligosaccharides, like a pectin, oligourethanes, or polypeptides. Preferably, the oligomer or polymer of a saccharide, oligourethane, polypeptide, oligomer or polymer of a polyol, or oligomer or polymer of an organic acid has a formula molecular weight (formula weight) of less than 2,500, or, preferably, a formula weight of from 150 to 2,000, or, more preferably, a formula weight of from 150 to 1,000.

Preferably, polar organic carrier components are anhydrous. If necessary, any polar organic carrier components may be dessicated wholly or partly, such as by vacuum flashing, prior to incorporation into the deep eutectic solvent mixture. Further, and more preferably, as polar organic carrier components may be hygroscopic, they should be handled in a controlled atmosphere and/or kept in a sealed container before and during mixing and storage until use.

Preferably, the polar organic carrier component of the present invention is chosen from glycerol, propoxylated glycerols, anhydrous ethylene glycol, urea, acetamide, 1-methyl urea, 1,3-dimethyl urea, thiourea and carbohydrates.

Preferably, in accordance with the polar organic carrier component of the present invention any (poly)organic acids that comprise the polar organic carrier component are weak acids that are not highly corrosive in use.

More preferably, the polar organic carrier component in accordance with the present invention comprises 15 wt. % or less, or, preferably, 10 wt. % or less of any organic acid.

The deep eutectic solvent mixture compositions of the present invention may comprise as the polar organic carrier component polyfunctional or polymeric materials, such as polyols, polypeptides, oligoacids, polymeric polyacids, oligopolyols and polymeric polyols having a formula molecular weight (formula weight) of from 150 to 2,500, or preferably, from 150 to 2,000, or, more preferably, from 150 to 1,000.

Suitable amounts of the polar organic carrier component in the deep eutectic solvent mixture may range from 40 to 99 mol. %, or, preferably, from 45 to 95 mol. %, or, more preferably, from 50 to 90 wt. %, with the remainder of the deep eutectic solvent mixture comprising the anhydrous cation containing component.

Suitable anhydrous cation containing components can be chosen from non-toxic quaternary ammonium containing materials, such as one or more of choline chloride (ChCl), hydroxyethyl)trimethylammonium chloride; ammonium salts like ammonium chloride; or other organoammonium salts, such as 1-n-butyl-3-methylimidazolium salts, for example, 1-n-1-butyl-3-methylimidazoliumBF$_4$; simple salts, including metal carbonates, like potassium carbonate, semi-metal carbonates, metal halides; semi-metal halides, metal nitrates, metal nitrites, metal sulphates, metal phosphates, metal citrates, metal acetates and other Lewis Acids; salts of cyanamide; metal cations combined with non-volatile amines; onium salts; organic nitrides; organic sulfonates, such as benzyltriphenylphosphonium halides; metal cations combined with organic nitrides, such as $(CF_3CO_2)_2N$; metal cations combined with organic sulfonates, such as trifluoromethanesulfonate; metal cations combined with organic sulfonyl group containing compounds, such as bis(trifluoromethanesulphonyl) imide, metal cations combined with tris(trifluoromethanesulphonyl) methide; or two or more of any of the above listed anhydrous cation containing components.

Preferably, any anhydrous cation containing component may be dessicated wholly or partly, such as by vacuum flashing, prior to incorporation into the deep eutectic solvent mixture. Further, and more preferably, as anhydrous cation containing components may be hygroscopic, they should be handled in a controlled atmosphere and/or kept in a sealed container before and during mixing and storage until use. The suitable anhydrous cation containing component in accordance with the cement paste composition of the present invention can comprise one or more Lewis acids, such as metal halides, like aluminum or iron halides, or (semi)metal carbonates.

Suitable anhydrous cation containing components in accordance with the present invention may also contain less than a substantial amount of salt bound water in amounts that allow the compositions to remain substantially water free. Preferably, the anhydrous cation containing component in accordance with the cement paste composition of the present invention is chosen from choline chloride or metal carbonates, such as potassium carbonate, or the potassium, sodium, calcium, zinc, or lithium bromides or salts of acetic acid.

Examples of a preferred deep eutectic solvent mixture include $K_2CO_3$:glycerol in molar ratios of from 1:1 to 1:6 or, for example, from $K_2CO_3$:ethylene glycol, preferably anhydrous ethylene glycol, in weight ratios of from 1:3 to 1:8 (see F. S. Majalli et. al., *Thermochimica Acta*, 2014, no. 575, pages 135-143), or, in a further example, $K_2CO_3$ and propoxylated glycerol in molar ratios of from 1:14 to 1:30, or, preferably, from 1:16 to 1:23.

Deep eutectic solvent mixtures are formed by simply mixing together a polar organic carrier component and one or more cation containing component, which components are capable of forming an associative eutectic mixture. Simple mixing may comprise stirring the mixture to dissolve for a period of from 10 min to 48 hours, or, preferably, from 1 to 24 hours, at a mixing temperature of from room temperature to the boiling point of the polar organic carrier component, such as 280° C. or below, preferably, from 40 to 100° C., and becomes easier and quicker at higher temperatures.

Suitable equipment for making a deep eutectic solvent mixture may include, for example, a mechanical mixer, homogenizer or a dissolver, preferably, equipped with a devolitalizer.

In accordance with the cement paste compositions of the present invention, any suitable aluminate cement binder may be used. Accordingly, the aluminate cement paste compositions of the present invention can comprise a wide variety of hydraulic setting compositions used in a wide variety of applications, including skim coats, renders or plasters, stucco, waterproofing membranes and cementitious coatings.

Preferably, the hydraulic aluminate binder in accordance with the cement paste compositions of the present invention comprises an alkali aluminate cement, such as a white cement or a calcium aluminate cement.

The aluminate cement paste compositions of the present invention may comprise anhydrous additives in addition to the aluminate cement and deep eutectic solvent mixture so long as the additives do not hamper storage stability. Suitable anhydrous additives for use in the aluminate cement paste compositions may include, for example, pigments, inorganic colloidal particles or fillers (e.g. alumina or silica), reducing agents; non-aqueous polymers, such as synthetic thickeners, dispersants like polycarboxylates, and polymeric superplasticizers, like ethoxylated polycarboxylates; plasticizers, oils, defoamers, and air entraining agents. Any of the anhydrous additives useful in the aluminate cement paste compositions of the present invention can be included at any time, including at the time of use; however, such additives do not hamper storage stability in the amounts they are used.

If necessary, any anhydrous additive may be dessicated wholly or partly, such as by vacuum flashing, prior to incorporation into the deep eutectic solvent mixture.

In accordance with the aluminate cement paste compositions of the present invention, suitable amounts of the deep eutectic solvent mixture may range from 20 to 80 wt. %, or, preferably, from 25 to 65 wt. %, based on the total weight of the composition.

In accordance with the aluminate cement paste compositions of the present invention, suitable amounts of the aluminate cement solids may range from 20 to 73, or, preferably, from 35 to 65 wt. %, or, more preferably, from 50 to 60 wt. %, based on the total weight of the composition. The amount of aluminate cement should be high enough such that he composition sets within at most 48 hours and low enough so that the aluminate cement paste composition remains sufficiently fluid or liquid to enable use in the desired application.

In accordance with the aluminate cement paste compositions of the present invention, suitable amounts of the anhydrous additives, with the exception of fillers, may range from 0 to 40 wt. %, or, preferably, from 0 to 20 wt. %, based on the total weight of the aluminate cement paste composition. Anhydrous fillers can be added in amounts so that the total of cement and filler solids remains below 75% of the total solids of the cement paste composition, for example, up to 60 wt. %, or, preferably, from 10 to 40 wt. %, of the total cement paste composition.

In another aspect of the present invention, methods of making the cement paste compositions comprise forming the deep eutectic solvent mixture by mixing the polar organic carrier component and the anhydrous cation containing component, as disclosed above, such as in a mechanical mixer, dissolver or homogenizer, preferably, equipped with a devolatilizer, followed by dispersing in either order of addition, the aluminate cement and any anhydrous additives, if used, in the deep eutectic solvent mixture. Such dispersing can be carried out in an extruder, cement mixer, or mechanical mixer, such as a banbury or Hobart mixer, homogenizer. The aluminate cement paste compositions are substantially water free and can be stored and/or shipped prior to use.

In accordance with the methods of making the aluminate cement paste compositions of the present invention, the methods of making the aluminate cement paste compositions comprise mixing a deep eutectic solvent mixture with an aluminate cement, thereby stabilizing the cement. Such a method has the advantage of avoiding retarder materials because the aluminate cement paste composition will begin to set merely by bringing it in contact with water and avoids any step of removing or diluting retarders.

In the methods of making the aluminate cement paste compositions of the present invention, the dispersing may comprise mixing the deep eutectic solvent mixture and the aluminate cement for from 5 to 120 minutes, for example, from 10 to 45 minutes.

In yet another aspect of the present invention, methods of making the hydraulic setting aluminate compositions or of activating the aluminate cement paste compositions of the present invention comprise bringing the aluminate cement paste composition into contact with water or an aqueous liquid and, if desired, in use additives, for example, activator salts or bases. The bringing of the aluminate cement paste composition into contact with water may be carried out in a suitable mixing apparatus, such as in a cement mixer or a rotary mixer, such as a paddle mixer attachment mounted on a drill.

Once activated with water to form hydraulic setting aluminate compositions from the aluminate cement paste compositions of the present invention, the compositions begin to cure and release an exotherm. Accordingly, the aluminate cement paste compositions once activated with water become hydraulic setting aluminate compositions. Water thus activates the aluminate cement paste composition to make an hydraulic setting aluminate composition. Aside from water or aqueous coating compositions, other in use additives, such as, for example, accelerators or retardants, for example, lithium salts, may also be added to the aluminate cement paste compositions of the present invention to form hydraulic setting aluminate compositions. Such in use additives can be pre-mixed with water, aqueous liquid or coating composition, or with the cement paste compositions prior to bringing the cement paste composition into contact with water. Or all materials can be brought together simultaneously at the time of use.

In accordance with the hydraulic setting aluminate compositions of the present invention, the compositions may comprise from 0 to 5 wt. %, or, preferably, 0.001 wt. % or more, and 5 wt. % or less of in use additives other from water or aqueous coatings, based on the total weight of the aluminate cement paste composition.

The hydraulic setting aluminate compositions of the present invention cure with little or no additional lithium salt or accelerating salt. Suitable amounts of activators such as lithium salts or bases ranges from 0 to 4 wt. %, or, preferably, from 0 to 2 wt. %, based on the total weight of the aluminate cement paste composition.

In still yet another aspect of the present invention, methods of using the aluminate cement paste compositions of the present invention comprise bringing the aluminate cement paste composition in contact with water at once or, preferably, by gradually adding the water, for example, in a cement mixer to form the hydraulic setting aluminate composition, applying, spraying or pouring the resulting hydraulic setting aluminate composition to, on or into a substrate, such as a road, wall or a concrete structure, and allowing it to cure.

In coating applications, the methods of bringing the cement paste compositions into contact with water or an aqueous liquid, such as an aqueous coating composition such as an emulsion (co)polymer, to form hydraulic setting compositions comprise mixing the cement paste composition with an aqueous coating composition before applying it to a substrate. In such applications an aqueous coating composition may be chosen from an aluminate cement compatible emulsion (co)polymer, such as an acid stabilized emulsion copolymer, a metastable emulsion copolymer or a phosphorus acid group containing emulsion polymer which will not precipitate out upon simple mixing with the aluminate cement paste compositions.

In one example, an aluminate cement compatible emulsion copolymer is a metastable emulsion copolymer having, in copolymerized form, from 0.01 to 5 wt. % of acid functional monomers, based on the total weight of copolymer solids.

Preferably, in accordance with the present invention an aqueous coating composition comprises an acrylic aqueous emulsion copolymer having a calculated glass transition temperature ($T_g$) of from −30 to 10° C., and aqueous emulsion copolymer is the copolymerization product of (i) from 60 to 89.9 wt. % of one or more nonionic (meth)acrylic monomers, such as butyl acrylate, (ii) from 1 to 40 wt. % of one or more vinyl aromatic monomers, (iii) from 0.1 to 2.0 wt. % of one or more monomers chosen from itaconic acid, methacrylic acid, amides of a,β-unsaturated $C_3$ to $C_6$ mono- or di-carboxylic acids, and mixtures thereof, all wt. % s of monomers based on the total monomer solids. Preferably, the aqueous emulsion copolymer in this paragraph has at least one residue of an ascorbic acid reducing agent or is the copolymerization product of a monomer (iii) comprising itaconic acid.

An example of an acid functional copolymerized monomer for use in making a metastable emulsion polymer in accordance with the present invention can be acrylic or methacrylic acid, itaconic acid, or phosphorus containing acids.

An example of a suitable phosphorus acid group containing emulsion polymer in accordance with the present invention comprises the copolymerization product of, as copolymerized units, from 0.1% to 10%, preferably from 1% to 5%, phosphorous-acid monomers.

As used herein, the term "phosphorous-acid monomers" herein includes salts of those monomers, and mixtures thereof. Typical phosphorous-acid monomers include dihydrogen phosphate-functional monomers such as dihydrogen phosphate esters of an alcohol in which the alcohol also contains a polymerizable vinyl or olefinic group, such as allyl phosphate, mono- or diphosphate of bis(hydroxymethyl) fumarate or itaconate, derivatives of (meth)acrylic acid esters, such as, for examples phosphates of hydroxyalkyl(meth)acrylates including 2-hydroxyethyl (meth)acrylate, 3-hydroxypropyl (meth)acrylates, and the like. Other suitable phosphorous acid monomers include $CH_2=C(R)-C(O)-O-(R_1O)_n-P(O)(OH)_2$, where R=H or $CH_3$ and R1=alkyl, such as SIPOMER™ PAM-100, SIPOMER™ PAM-200, SIPOMER™ PAM-300, and SIPOMER™ PAM-4000, available from Rhodia, Inc. Other suitable phosphorus acid monomers are phosphonate functional monomers, disclosed in WO 99/25780 A1, and include vinyl phosphonic acid, allyl phosphonic acid, 2-acrylamido-2-methylpropanephosphonic acid, α-phosphonostyrene, 2-methylacrylamido-2-methylpropanephosphonic acid. Further suitable phosphorus functional monomers are Harcross T-Mulz 1228 and 1,2-ethylenically unsaturated (hydroxy)phosphinylalkyl (meth)acrylate monomers, disclosed in U.S. Pat. No. 4,733,005, and include (hydroxy)phosphinylmethyl methacrylate. Preferred phosphorus acid monomers are dihydrogen phosphate monomers, which include 2-phosphoethyl (meth)acrylate, 2-phosphopropyl (meth)acrylate, 3-phosphopropyl (meth)acrylate, and 3-phospho-2-hydroxypropyl (meth)acrylate. Preferred are 2-phosphoethyl (meth)acrylate, 2-phosphopropyl (meth)acrylate, 3-phosphopropyl (meth)acrylate, 3-phospho-2-hydroxypropyl (meth)acrylate, SIPOMER™ PAM-100 monomer a phosphate ester of polyethylene glycol monomethacrylate (Solvay S. A., Brussels, BE), and SIPOMER™ PAM-200 monomer a phosphate ester of polypropylene glycol monomethacrylate.

Suitable phosphorus acid group containing emulsion polymers in accordance with the present invention include the copolymerization product of at least one nonionic copolymerized monoethylenically unsaturated monomer such as, for example, a (meth)acrylic ester monomer including methyl (meth)acrylate, ethyl (meth)acrylate, butyl (meth) acrylate, 2-ethylhexyl (meth)acrylate, decyl (meth)acrylate, hydroxyethyl (meth)acrylate, hydroxypropyl (meth)acrylate, ureido-functional (meth)acrylates and acetoacetates, acetamides or cyanoacetates of (meth)acrylic acid; styrene or substituted styrenes; vinyl toluene; butadiene; monoethylenically unsaturated acetophenone or benzophenone derivatives such as, for example are taught in U.S. Pat. No. 5,162,415; vinyl acetate or other vinyl esters; vinyl monomers such as vinyl chloride, vinylidene chloride, and N-vinyl pyrollidone; and (meth)acrylonitrile. The use of the term "(meth)" followed by another term such as (meth)acrylate or (meth)acrylamide, as used throughout the disclosure, refers to both acrylates or acrylamides and methacrylates and methacrylamides, respectively.

In addition to the copolymerized phosphorous-acid monomer, phosphorus acid group containing emulsion polymers may include as copolymerized units, carboxylic acid monomer in the amount of from 0% to 6%, preferably from 0% to 1%, more preferably a de minimus amount, of carboxylic acid monomer such as, for example, acrylic acid, methacrylic acid, crotonic acid, itaconic acid, fumaric acid, maleic acid, monomethyl itaconate, monomethyl fumarate, monobutyl fumarate, and maleic anhydride.

Suitable phosphorus acid group containing emulsion polymers may comprise the copolymerized product of from 0% to 5%, by weight; or in the alternative, from 0% to 1%, by weight; or from 0% to 0.2%, by weight; based on the weight of the emulsion polymer solids, of a copolymerized multi-ethylenically unsaturated monomer. In certain embodiments the emulsion polymer is free from copolymerized multi-ethylenically unsaturated monomer. Multi-ethylenically unsaturated monomers include, for example, allyl (meth)acrylate, diallyl phthalate, 1,4-butylene glycol di(meth)acrylate, 1,2-ethylene glycol di(meth)acrylate, 1,6-hexanediol di(meth)acrylate, and divinyl benzene.

As used herein, the term "calculated glass transition temperature ("calculated Tg") means that Tg as calculated herein by using the Fox equation (T. G. Fox, *Bull. Am. Physics Soc.*, Volume 1, Issue No. 3, page 123 (1956)), that is, for calculating the Tg of a copolymer of monomers M1 and M2, $1/Tg(\text{calc.}) = w(M1)/Tg(M1) + w(M2)/Tg(M2)$, wherein Tg(calc.) is the glass transition temperature calculated for the copolymer w(M1) is the weight fraction of monomer M1 in the copolymer w(M2) is the weight fraction of monomer M2 in the copolymer Tg(M1) is the glass transition temperature of the homopolymer of M1

Tg(M2) is the glass transition temperature of the homopolymer of M2, all temperatures being in ° K.

The glass transition temperature of homopolymers may be found, for example, in the "Polymer Handbook", edited by J. Brandrup and E. H. Immergut, Wiley Interscience Publishers, 1989.

Suitable aqueous emulsion polymers desirably have solids contents greater than 50% on a weight basis and are prepared by polymerization techniques that are well known in the art such as, for example, as disclosed in U.S. Pat. Nos. 4,325,856; 4,654,397; and 4,814,373. Conventional surfactants may be used such as, for example, anionic and/or nonionic emulsifiers. Either thermal or redox initiation processes may be used, preferably, redox. Conventional free radical initiators may be used such as, for example, alkali persulfates, typically at a level of 0.01% to 3.0% by weight, based on the weight of total monomer. Redox systems using the same initiators may be coupled with a suitable reductant such as, for example, sodium sulfoxylate formaldehyde.

Other aluminate cement compatible emulsion (co)polymer binders include any that do not coagulate at a pH of above 9 or that do not coagulate upon mixing with the aluminate cement paste composition, at least until the cement cures.

Desirable emulsion copolymers for use in the hydraulic setting applications in accordance with the present invention generally have a glass transition temperature binder (Tg) as determined by Differential Scanning Calorimetry (DSC, from −100 to 100 C at 10° C./minute taking the midpoint of the inflection as the DSC transition) of from −30 to 50° C. or, preferably, from −30 to 20° C.

Suitable emulsion (co)polymers for use in accordance with the present invention may contain in use additives, such as shrinkage reducing additives and activators, such as lithium salts and bases.

Suitable amounts of the aluminate cement compatible emulsion copolymer for use in making the hydraulic setting aluminate compositions, such as for use in coatings, may range up to 40 wt. % or, preferably, from 2 to 25 wt. %, based on the total weight of the resulting hydraulic setting aluminate composition.

Regardless of the application, the activated aluminate cement paste composition or hydraulic setting aluminate composition cures rapidly. Accordingly, only a small amount of the aluminate cement needs to be included in use. Preferably, when water or an aqueous liquid, including water as part of an aqueous coating composition or emulsion (co)polymer composition, is brought into contact with the aluminate cement paste compositions, the aluminate cement solids comprise from 0.4 to 3 wt. %, or, more preferably, 1 to 2.5 wt. % of the total final (wet) hydraulic setting aluminate compositions. In such compositions comprising an aqueous emulsion polymer, the ratio of polymer to aluminate cement solids may be as high as 50:1, by weight, and generally ranges from 1:1 to 12:1.

EXAMPLES

The following examples are used to illustrate the present invention without limiting it to those examples. Unless otherwise indicated, all temperatures are ambient temperatures (21-23° C.) and all pressures are 1 atmosphere.

Materials used in the Examples, below, include the following materials:

Calcium aluminate cement 1 or CAC 1: Calcium aluminate cement (Calcium aluminate solids content: >90% (92 to 98%)), HiPercem™ cement (Calucem, Mannheim, DE);

Calcium aluminate cement 2 or CAC 2: Ternal™ white cement (calcium aluminate solids content: 97 to 99.7%) (Imerys (Kerneos), Paris, FR);

Calcium aluminate cement 3 or CAC 3: EXALT™ Calcium aluminate (Kerneos, Paris, FR). Solids: Aluminate content 67 wt. %, stabilized with phosphoric acid 270 mmole/L to give a pH of 5 to 7 in water at 60 wt. % solids;

Examples 1 and 2 and Comparative Examples 1 and 2: Cement Paste Preparation and Storage As shown in Table 1, below, in Examples 1 and 2, a deep eutectic solvent mixture was prepared from $K_2(CO)_3$ (40 g) dissolved in glycerol (192 g), at 90° C. by mixing for four (4) hours in a mechanical mixer equipped with a magnetic stirrer. To prepare the aluminate cement paste composition, the deep eutectic solvent mixture 45 pbw was mixed with CAC 1-55 pbw and $Ca(OH)_2$ (29 mg per g deep eutectic solvent mixture). If used, a lithium sulfate monohydrate salt was dispersed in 48.5 g of the deep eutectic solvent mixture. Then, the indicated calcium aluminate cement (CAC 1) was mixed in a mechanical mixer at from 60 to 90° C. by adding the cement in ten roughly equal portions, wherein each portion was mixed for one (1) minute and then the resulting product was mixed for 5 more minutes. The ratio of aluminate cement solids to the deep eutectic solvent mixture was 0.55:0.45, by weight.

The aluminate cement paste compositions indicated in Table 1, below, were used as an activator in Examples 1 and 2, except that in Example 2, the aluminate cement paste composition was kept at −15° C. over 15 hours. In Comparative Example 2, the aluminate cement paste composition comprised a phosphoric acid stabilized aqueous aluminate cement paste composition, CAC 3.

In each example, an aqueous acrylic styrene emulsion copolymer (Primal™ AS-8012, Dow, MFFT −8° C.) having a solids content of 54.93 wt. % and the aluminate cement paste compositions indicated in Table 1, below, were combined with the remaining materials in Table 2, below, in a mechanical mixer equipped with a polytetrafluoroethylene coated mechanical stirring bar and mixed for 5 minutes.

In addition, the cementitious basecoat formulation in Comparative Example 2 contained 2 wt. %, based on total cement solids of a PERAMIN™ AXL 80 lithium sulfate monohydrate salt (Kerneos) was added as an activator.

In all examples, the ratio between cement solids and acrylic emulsion polymer solids was 55:45 (w/w). If the pH was not at 12.5, the pH was adjusted to 12.5 with NaOH 20% (w/w) after activation in all examples. The granular basecoat compositions were applied to a cementitious rendering mortar 2 mm (SM700 Pro, Knauf Gips KG, Iphofen, DE)) as a substrate having a thickness of 2 mm.

The resulting emulsion copolymer binder containing cementitious coatings were dried under cold, humid (5° C., 50% rH) conditions in the absence (Comp. Ex. 1) or presence of aluminate cement paste compositions (Ex. 1 and 2, Comp. Ex. 2).

The coatings were then dried for 6 hours at 5° C. and 85% relative humidity, before an early rain-resistance test was performed. In the Early rain resistance test, the dried coatings were exposed to a 30 minute cold water shower (conventional shower head) wherein the water pressure in the tube was 5 bar and the distance from the shower head to the panel was 20 cm.

TABLE 1

Early Rain Resistance Performance

| Example | Deep eutectic solvent mixture and Aluminate cement paste composition | Aluminate Cement Paste Pretreatment | Early rain resistance |
|---|---|---|---|
| 1 | DES ($K_2CO_3$: Glycerol as 1:4.8 mol/mol) 45 pbw and CAC 1-55 pbw | None | Yes, coating intact |
| 2 | DES ($K_2CO_3$: Glycerol as 1:4.8 mol/mol) 45 pbw and CAC 1-55 pbw | −15° C./15 h | Yes, coating intact |
| Comp. 1* | None | None | No, wash-off, no film |
| Comp. 2* | CAC 3 | None | No, wash-off |

*Denotes Comparative Example.

As shown in Table 1, above, the paste of inventive Example 1 gave a coating that was dry to the touch after 2 hours while the paste of comparative Example 1 was not dry after 6 hours, demonstrating the accelerating hardening effect of the cement paste. Furthermore, both inventive Examples 1 and 2 passed the early water resistance tests, while the comparative Examples 1 and 2 did not; instead, the coatings washed off.

In Example 2, the aluminate cement paste composition remained stable, and did not sediment after being kept at −15° C. over 15 hours. So, only the inventive aluminate cement paste compositions of Examples 1 and 2 passed all tests.

TABLE 2

Composition of coating formulation used in the Table 1 Examples

| Component | Material | wt. % |
|---|---|---|
| Dispersant | Polycarboxylate polymer (Orotan ™ 850 ER, Dow, Midland, MI) | 0.18 |
| Antifoam | Hydrocarbons and surfactants (Foamaster ™ MO 2134, BASF, Ludwigshaven, DE) | 0.04 |

TABLE 2-continued

Composition of coating formulation used in the Table 1 Examples

| Component | Material | wt. % |
|---|---|---|
| Water | | 10.78 |
| Thickener | Cellulose ether (Walocel ™ MW 40000 PFV, Dow) | 0.07 |
| Emulsion Copolymer | Acrylic Emulsion co-polymer (Primal ™ AS 8012, Dow) | 4.63 |
| Extender I | Calcium carbonate ($CaCO_3$) (Durcal ™ 2 Omya, Oftringen, CH) | 18.18 |
| Extender II | Calcium carbonate ($CaCO_3$) (Durcal ™ 40 Omya, Oftringen, CH) | 10.08 |
| Aggregates | Quarzsand ($SiO_2$) (Carlo Bernasconi Ag, Bern, CH) | 14.14 |
| Pigment | Iron oxide ($Fe_2O_3$) (BayferroxTM red 130, Lanxess, Cologne, DE) | 0.74 |
| Structural Granules | Calcium carbonate ($CaCO_3$) (OMYACARB ®, 2.5-3 mm, Oftringen, CH) | 41.18 |

Example Set II: Examples 3 and 4 and Comparatives 3 and 4

A coating composition was formulated according to Table 3, below, using a mechanical lab mixer (Dispermat™ mixer, Byk, Wallingford, CT). After resting for 24 h the aluminate cement paste indicated in Table 4, below, was added to the coating composition. After addition, the mixture was manually homogenized for 3 minutes. The activated coatings were then applied to polystyrene panels coated with an organic, cement free dispersion base coat (Elasto™, Sto AG, Stühlingen, DE) and dried under controlled conditions (80% relative humidity and 7° C.). After 8 hours the panel was vertically exposed to the early rain resistance (ERR) test. Water was sprayed for 15 minutes with an axial-flow full cone nozzle (type 490 404 CA, Lechler GmbH, Metzingen, DE) under a pressure of 2 bar that was placed 30 cm from the sample surface in a 90 degree angle. Results are shown in Table 4, below.

Dry Tip tests were performed on drying coatings by pressing a paper towel on to the coating each 60 min by hand. If no wet material sticks to the paper the sample is considered to be dry. Results are shown in Table 4, below.

TABLE 3

Coating formulation composition

| Material | wt % |
|---|---|
| Polycarboxylate polymer (Orotan ™ 850 ER, Dow, Midland, MI) | 0.31 |
| Mixtures of paraffin-based mineral oil and hydrophobic components, containing silicone (BYK 038, BYK Chemie) | 0.06 |
| Water | 15.24 |
| Celulose Ether (Walocel MW 40000 PFV, Dow, Midland, MI) | 0.12 |
| Acrylic Emulsion Co-polymer (Acousticryl ™ AV-1420, Dow, Midland, MI) | 8.56 |
| Calcium carbonate ($CaCO_3$) (Durcal ™ 2 Omya, Oftringen, CH) | 31.90 |
| Calcium carbonate ($CaCO_3$) (Durcal ™ 40 Omya, Oftringen, CH) | 17.69 |

TABLE 3-continued

| Coating formulation composition | |
|---|---|
| Material | wt % |
| Quarzsand (SiO$_2$) (Carlo Bernasconi Ag, Bern, CH) | 24.81 |
| Iron oxide (Fe$_2$O$_3$) (Bayferrox ™ red 130, Lanxess, Cologne, DE) | 1.30 |
| | 100.00 |

TABLE 4

Comparison of coating drying and early rain resistance (ERR) of coatings with Aluminate Cement Pastes

| Example | Aluminate Cement Paste | Coating formulation/ Cement Paste | Tip dry, 1 h | Tip dry, 2 h | Tip dry, 3 h | ERR, 8 h at 80% rel humidity, 7° C. |
|---|---|---|---|---|---|---|
| 3 | DES (K$_2$CO$_3$:Ethylene Glycol as 1:4.8 mol/mol) 35 pbw and CAC 1-65 pbw | 50 g/5.0 g | pass | pass | pass | pass |
| 4 | DES (K$_2$CO$_3$:Ethylene Glycol as 1:4.8 mol/mol) 35 pbw and CAC 1-65 pbw | 50 g/4.2 g | pass | pass | pass | pass |
| Comp. 3* | CAC 3 | 50 g/4.6 g | fail | fail | pass | fail |
| Comp. 4* | — | 50 g/0 g | fail | fail | pass | fail |

*Denotes Comparative Example

As shown in Table 4, above, the inventive aluminate cement paste compositions of Examples 3 and 4 passed all tests whereas the Comparative Example 3 stabilized aqueous aluminate cement paste composition needed three hours to pass the tip dry test but still failed the early rain resistant test. The ordinary cement composition of Comparative Example 4 failed all tests.

We claim:

1. A hydraulic setting composition comprising:
(a) a substantially water free aluminate cement paste composition comprising a deep eutectic solvent mixture of a polar organic carrier component in association with an anhydrous cation containing component, and, further, an aluminate cement; and
(b) an aqueous emulsion copolymer,
wherein the hydraulic setting composition provides quick drying and early rain resistance down to temperatures of 5° C.

2. The hydraulic setting composition as claimed in claim 1, wherein the polar organic carrier component of the deep eutectic solvent mixture is a polar protic organic liquid chosen from a hydrogen donor.

3. The hydraulic setting composition as claimed in claim 1, wherein the polar organic carrier component of the deep eutectic solvent mixture is chosen from glycerol, propoxylated glycerols, ethylene glycol, C$_3$ to C$_{18}$ alkane diols, urea, acetamide, 1-methyl urea, 1,3-dimethyl urea, thiourea, benzamide, carboxylic acids, polyols or carbohydrates, oligomers or polymers of a diol, oligomers or polymers of a polyol, oligomers or polymers of an organic acid, oligomers or polymers of a carbohydrate, oligourethanes, polypeptides, or two or more of these.

4. The hydraulic setting composition as claimed in claim 1, wherein the amount of the polar organic carrier component in the deep eutectic solvent mixture ranges from 40 to 99 mol. %, with the remainder comprising the anhydrous cation containing component.

5. The hydraulic setting composition as claimed in claim 1, wherein the anhydrous cation containing component is chosen from non-toxic quaternary ammonium containing materials; ammonium salts, organoammonium salts, simple salts; salts of cyanamide; metal cations combined with non-volatile amines; onium salts; metal cations combined with organic nitrides; metal cations combined with organic sulfonates, metal cations combined with organic sulfonyl group containing compounds, or two or more of these.

6. The hydraulic setting composition as claimed in claim 1, above, wherein the anhydrous cation containing component is chosen from choline chloride (ChCl), (hydroxyethyl) trimethylammonium chloride, ammonium chloride, 1-n-butyl-3-methylimidazolium salts, metal carbonates, semi-metal carbonates, metal halides, semi-metal halides, metal nitrates, metal nitrites, metal sulphates, metal phosphates, metal carbodiimides, salts of cyanamide, metal citrates, metal acetates, non-volatile amines, benzyltriphenylphosphonium halides, metal cations combined with (CF$_3$CO$_2$)$_2$N, metal cations combined with trifluoromethanesulfonate, metal cations combined with bis(trifluoromethanesulfonyl) imide, metal cations combined with tris(trifluoromethanesulfonyl) methide, or two or more of any of these.

7. The hydraulic setting composition as claimed in claim 1, wherein the deep eutectic solvent mixture comprises K$_2$CO$_3$ and glycerol in a molar ratio of from 1:1 to 1:6, K$_2$CO$_3$ and ethylene glycol in a molar ratio of from 1:3 to 1:8, or K$_2$CO$_3$ and propoxylated glycerol in molar ratios of from 1:14 to 1:30.

8. The hydraulic setting composition as claimed in claim 1, wherein the amount of the deep eutectic solvent mixture ranges from 20 to 95 wt. %, based on the total weight of the composition.

9. The hydraulic setting composition as claimed in claim 1, wherein the emulsion copolymer has a Tg from −30° C. to 10° C.

10. The hydraulic setting composition as claimed in claim 1, wherein the emulsion copolymer contains from 0.1 to 10% copolymerized units of acid functional monomers of acrylic or methacrylic acid, itaconic acid, phosphorus containing acids, or mixtures thereof.

11. The hydraulic setting composition as claimed in claim 1, further comprising a pigment, a filler, a thickener, a dispersant, a defoamer, a plasticizer, or any combination thereof.

12. A hydraulic setting aluminate composition comprising the substantially water free aluminate as claimed in claim 1 in combination with an aqueous coating composition.

* * * * *